(12) United States Patent
Wang

(10) Patent No.: US 7,051,420 B2
(45) Date of Patent: *May 30, 2006

(54) METHOD FOR MANUFACTURING AN ARMATURE OF AN ELECTRIC MOTOR

(75) Inventor: Ren Hong Wang, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/404,857

(22) Filed: Apr. 1, 2003

(65) Prior Publication Data

US 2003/0159271 A1 Aug. 28, 2003

Related U.S. Application Data

(62) Division of application No. 09/594,357, filed on Jun. 14, 2000, now Pat. No. 6,566,782.

(51) Int. Cl.
*H02K 15/00* (2006.01)
*H02K 15/14* (2006.01)
*H02K 15/16* (2006.01)

(52) U.S. Cl. ............................. 29/596; 29/597; 29/598; 29/605; 29/606; 310/179; 310/184; 310/206; 310/225

(58) Field of Classification Search ................... 29/596, 29/597, 598, 605, 606; 310/179, 184, 206, 310/225
See application file for complete search history.

(56) References Cited

U.S. PATENT DOCUMENTS 841,545 A * 1/1907 Latour ..................... 310/225

2,103,166 A * 12/1937 Morrill ...................... 310/206
4,329,610 A    5/1982 Klein
4,933,586 A *  6/1990 Gotou ....................... 310/198
6,566,782 B1   5/2003 Wang ....................... 310/225

FOREIGN PATENT DOCUMENTS

CN   86203906    2/1987
CN   2054227     3/1990

* cited by examiner

*Primary Examiner*—A. Dexter Tugbang
*Assistant Examiner*—Tim Phan
(74) *Attorney, Agent, or Firm*—Harness, Dickey & Pierce, P.L.C.

(57) ABSTRACT

An armature for a brush commutated electric motor having a distributed coil winding arrangement for reducing brush arcing and electromagnetic interference (EMI). The winding pattern involves segmenting each coil into first and second subcoil portions with differing pluralities of turns. Each subcoil portion is wound around separate pairs of spaced apart slots of a lamination stack. Adjacent coils are wound such that one subcoil portion of each is wound in a common slot to therefore form an overlapping arrangement of each pair of adjacently coils. The winding pattern serves to "shift" the resultant magnetic axes of each coil in such a manner so as to significantly reduce brush arcing and the EMI resulting therefrom. The reduction in EMI is sufficient to eliminate the need for EMI reducing components, such as chokes, which have typically been required to maintain EMI to acceptably low levels. Commutation efficiency is also improved by the distributed winding pattern described above because of the reduction in the unevenness of the magnetic coupling between adjacent coils.

16 Claims, 5 Drawing Sheets

COIL

| | Subcoil A slots | Subcoil B slots |
|---|---|---|
| 1 | $(12/5)^7$ | $(1/6)^{17}$ |
| 2 | $(1/6)^{17}$ | $(2/7)^7$ |
| 3 | $(1/6)^7$ | $(2/7)^{17}$ |
| 4 | $(2/7)^{17}$ | $(3/8)^7$ |
| 5 | $(2/7)^7$ | $(3/8)^{17}$ |
| 6 | $(3/8)^{17}$ | $(4/9)^7$ |
| 7 | $(3/8)^7$ | $(4/9)^{17}$ |
| 8 | $(4/9)^{17}$ | $(5/10)^7$ |
| 9 | $(4/9)^7$ | $(5/10)^{17}$ |
| 10 | $(5/10)^{17}$ | $(6/11)^7$ |
| 11 | $(5/10)^7$ | $(6/11)^{17}$ |
| 12 | $(6/11)^{17}$ | $(7/12)^7$ |
| 13 | $(6/11)^7$ | $(7/12)^{17}$ |
| 14 | $(7/12)^{17}$ | $(8/1)^7$ |
| 15 | $(7/12)^7$ | $(8/1)^{17}$ |
| 16 | $(8/1)^{17}$ | $(9/2)^7$ |
| 17 | $(8/1)^7$ | $(9/2)^{17}$ |
| 18 | $(9/2)^{17}$ | $(10/3)^7$ |
| 19 | $(9/2)^7$ | $(10/3)^{17}$ |
| 20 | $(10/3)^{17}$ | $(11/4)^7$ |
| 21 | $(10/3)^7$ | $(11/4)^{17}$ |
| 22 | $(11/4)^{17}$ | $(12/5)^7$ |
| 23 | $(11/4)^7$ | $(12/5)^{17}$ |
| 24 | $(12/5)^{17}$ | $(1/6)^7$ |

Example: $(12/5)^7$ = 7 turns around slots 12 and 5

Figure 6

| | 12 | 1 | 2 | 3 | 4 | 5 | 6 | 7 | 8 | 9 | 10 | 11 |
|---|---|---|---|---|---|---|---|---|---|---|---|---|
| Winding Turns | 7₁ₐ | 17₁ᵦ | 7₂ᵦ | 7₄ᵦ | 7₆ᵦ | 7₁ₐ | 17₁ᵦ | 7₂ᵦ | 7₄ᵦ | 7₆ᵦ | 7₈ᵦ | 7₁₀ᵦ |
| | 7₁₂ᵦ | 17₂ₐ | 17₃ᵦ | 17₅ᵦ | 17₇ᵦ | 7₈ᵦ | 17₂ₐ | 17₃ᵦ | 17₅ᵦ | 17₇ᵦ | 17₉ᵦ | 17₁₁ᵦ |
| | 17₁₃ᵦ | 7₃ₐ | 17₄ₐ | 17₆ₐ | 17₈ₐ | 17₉ᵦ | 7₃ₐ | 17₄ₐ | 17₆ₐ | 17₈ₐ | 17₁₀ₐ | 17₁₂ₐ |
| | 17₁₄ₐ | 7₁₄ᵦ | 7₅ₐ | 7₇ₐ | 7₉ₐ | 7₁₁ₐ | 7₁₀ᵦ | 7₅ₐ | 7₇ₐ | 7₉ₐ | 7₁₁ₐ | 7₁₃ₐ |
| | 7₁₅ₐ | 17₁₅ᵦ | 7₁₆ᵦ | 7₁₈ᵦ | 7₂₀ᵦ | 7₂₂ᵦ | 17₁₁ᵦ | 7₁₂ᵦ | 7₁₄ᵦ | 7₁₆ᵦ | 7₁₈ᵦ | 7₂₀ᵦ |
| | 7₂₂ᵦ | 17₁₆ₐ | 17₁₇ᵦ | 17₁₉ᵦ | 17₂₁ᵦ | 17₂₃ᵦ | 17₁₂ₐ | 17₁₃ᵦ | 17₁₅ᵦ | 17₁₇ᵦ | 17₁₉ᵦ | 17₂₁ᵦ |
| | 17₂₃ᵦ | 7₁₇ₐ | 17₁₈ₐ | 17₂₀ₐ | 17₂₂ₐ | 17₂₄ₐ | 7₁₃ₐ | 17₁₄ₐ | 17₁₆ₐ | 17₁₈ₐ | 17₂₀ₐ | 17₂₂ₐ |
| | 17₂₄ₐ | 7₂₄ᵦ | 7₁₉ₐ | 7₂₁ₐ | 7₂₃ₐ | | 7₂₄ᵦ | 7₁₅ₐ | 7₁₇ₐ | 7₁₉ₐ | 7₂₁ₐ | 7₂₃ₐ |
| Total | 96 | 96 | 96 | 96 | 96 | 96 | 96 | 96 | 96 | 96 | 96 | 96 |

SLOTS

Figure 7

Examples:
$7_{12B}$ = 7 winding turns of subcoil 12B
$17_{2A}$ = 17 winding turns for subcoil 2A

METHOD FOR MANUFACTURING AN ARMATURE OF AN ELECTRIC MOTOR

CROSS REFERENCE TO RELATED APPLICATIONS

This application is a divisional of U.S. Ser. No. 09/594,357, filed Jun. 14, 2000, now U.S. Pat. No. 6,566,782.

TECHNICAL FIELD

This invention relates to electric motors, and more particularly to a winding pattern for winding the coils on an armature in a manner to reduce electromagnetic interference and arcing at the brushes in contact with the commutator of the armature.

BACKGROUND OF THE INVENTION

Present day brush commutated electric motors include an armature having a plurality of coils wound in slots formed in the lamination stack of the armature. With traditional motor designs, the lamination stack of the armature forms a plurality of circumferentially arranged slots extending between adjacent pairs of lamination posts. Typically, two coils per slot are used when winding the armature coils on the lamination stack. Among the two coils of the same slot, the one which commutates first is referred to as the first coil and the one which commutates second as the second coil. The second coil has inherently poorer magnetic commutation than the first coil because the second coil passes beyond the magnetic neutral zone within the stator before it finishes commutation. This is illustrated in simplified fashion in FIG. 1, wherein the commutation zone of the first coil is designated by $Z_1$ and the commutator zone of the second coil is designated by $Z_2$. A Rotor "R" is shown positioned at the mid-point of the first coil commutation zone. As a result, the second coil commutation can generate significant brush arcing, and becomes the dominant source of the total brush arcing of the motor. This can also cause electro-magnetic interference (EMI) to be generated which exceeds acceptable levels set by various government regulatory agencies. This brush arcing can also lead to accelerated brush wear.

Accordingly, it is a principal object of the present invention to provide an armature for a brush commutated electric motor having a plurality of coils wound thereon in a unique sequence which serves to significantly reduce brush arcing and improve the commutation efficiency of the motor.

It is a further object of the present invention to provide an armature for a brush commutated electric motor which incorporates a unique winding pattern for the coils wound on the armature in a manner which does not otherwise require modification of any component of the armature or the need for additional components.

It is still a further object of the present invention to provide a winding pattern for the armature coils of an armature which allows EMI components usually required to sufficiently attenuate the EMI generated by brush arcing to be eliminated, thus allowing the motor to be constructed less expensively and with fewer components.

SUMMARY OF THE INVENTION

The above and other objects are provided by an armature for a brush commutated electric motor incorporating a unique, distributed winding pattern for the coils thereof, in accordance with a preferred embodiment of the present invention. The winding pattern involves segmenting each coil into first and second subcoil portions. With a first coil, the first subcoil portion is wound around two spaced apart slots for a first plurality of turns and the second subcoil portion is wound around a second pair of spaced apart slots which are shifted circumferentially from the first pair of slots. The second subcoil portion is also formed by a different plurality of winding turns than the first subcoil portion. The two subcoil portions are wound in series with one end coupled to a first commutator segment of the armature and the other end coupled to a second commutator segment.

A second coil is also divided into first and second subcoil portions, with the first subcoil portion being wound with the same number of turns as the second subcoil portion of the first coil, and in the second pair of spaced apart slots. The second subcoil portion of the second coil, however, is laterally shifted such that it is wound in a third pair of spaced apart slots shifted laterally by one slot from the second pair of slots. The second subcoil portion of the second coil is also wound a plurality of turns in accordance with that of the first portion of the first coil. One end of the first subcoil portion of the second coil is coupled to commutator segment number two while the end of subcoil portion two of coil two is coupled to commutator segment number three.

Coil number three is segmented into first and second subcoil portions with the first subcoil portion being wound a number of turns in accordance with the second subcoil portion of the second coil, and wound around the second pair of spaced apart slots. The second subcoil portion of the third coil is wound around the third pair of spaced apart slots but with a number of turns in accordance with the first subcoil portion of the second coil. The end of the first subcoil portion of the third coil is coupled to commutator segment number three while the end of the second subcoil portion of coil three is coupled to commutator segment number four.

The above winding pattern continues in alternating fashion such that an overlapping of the coils occurs around the lamination stack. In effect, all of the first subcoil portions shift their magnetic axes forward with respect to rotation of the armature, and all of the second coil portions shift their magnetic axes backward relative to the direction of armature rotation. With a desired turns ratio between the two subcoil portions of each coil, which ratio may vary considerably but is preferably about 3:1, the above described winding pattern smoothes out the "unevenness" in the magnetic coupling between adjacent armature coils, thus improving commutation efficiency. This also improves the commutation efficiency for the second subcoil portion of each coil, thus reducing brush arcing. This in turn serves to significantly reduce EMI. The reduction of EMI eliminates the need for expensive EMI suppression components that have previously been required for use with the motor brushes to ensure that EMI levels remain below regulated limits.

BRIEF DESCRIPTION OF THE DRAWINGS

The various advantages of the present invention will become apparent to one skilled in the art by reading the following specification and subjoined claims and by referencing the following drawings in which:

FIG. 6 is a chart illustrating the locations of the various subcoils relative to the slots in the armature; and FIG. 7 is a chart illustrating the subcoils that are wound in each slot of the armature.

DETAILED DESCRIPTION OF THE PREFERRED EMBODIMENTS

Figure 2:
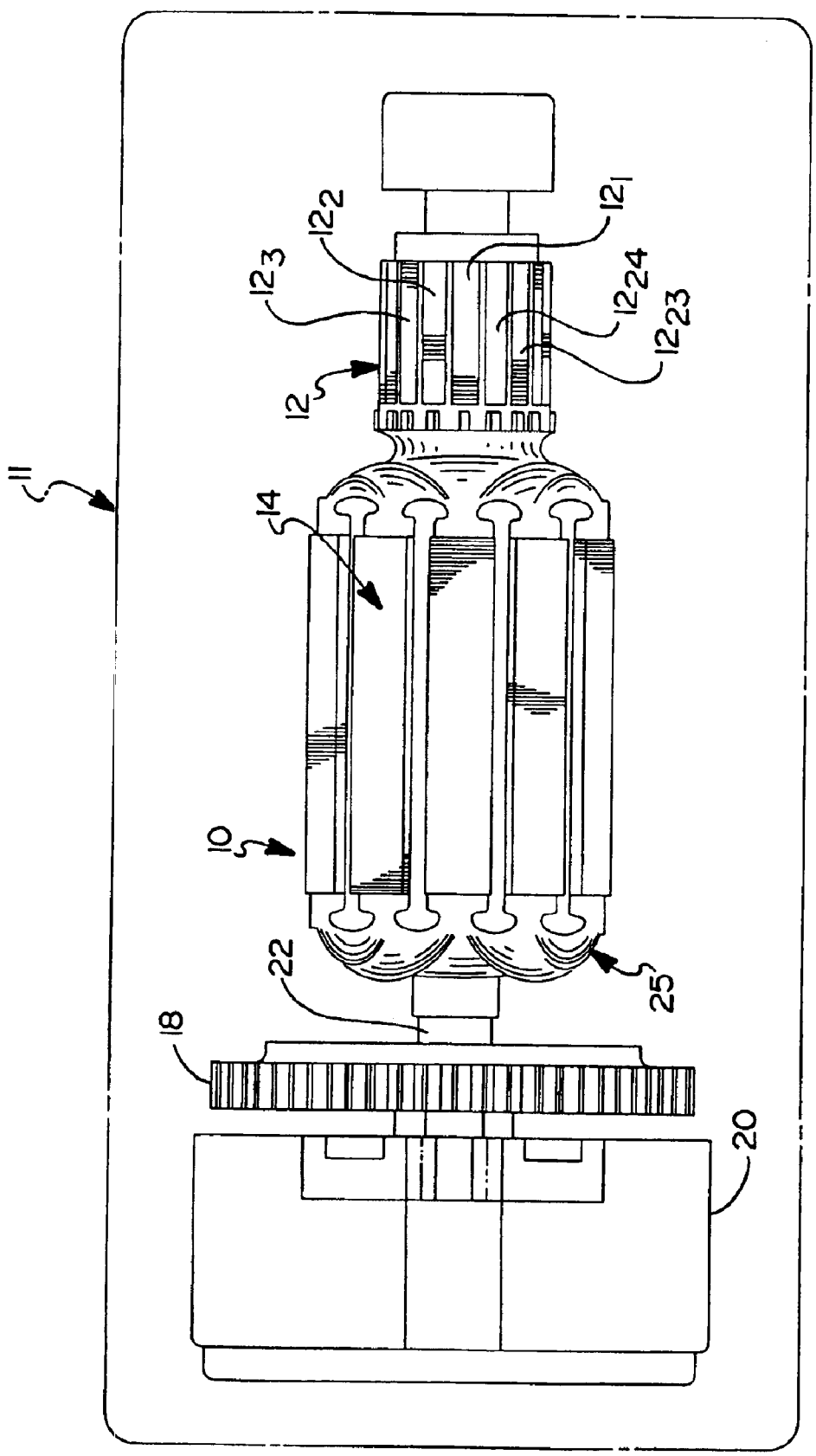
FIG. 2 is a side elevational view of an exemplary armature constructed in accordance with the teachings of the present invention.

Referring to FIG. 2, there is shown an armature 10 for a brush commutated electric motor 11 having a plurality of coils wound in accordance with the teachings of the present invention. The armature 10 includes a commutator 12 which, merely by way of example, includes 24 independent commutator segments $12_1$–$12_{24}$. A lamination stack 14 is used to support a plurality of 24 coils $25_1$–$25_{24}$ wound thereon. An armature shaft 22 extends through the lamination stack 14 and is fixedly coupled to a gear reduction assembly 20 and also to a fan 18. It will be appreciated, though, that the fan 18 and the gear reduction assembly 20 are optional and not essential to the armature 10 of the present invention, and shown merely because they are components that are often used in connection with an armature for an electric motor.

Figure 1:
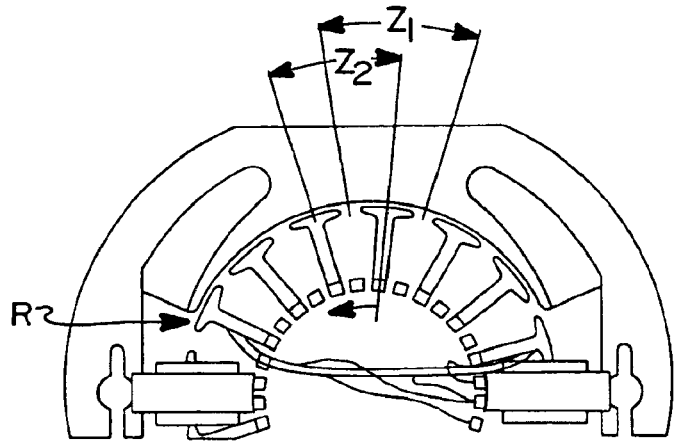
FIG. 1 is a simplified diagrammatic end view of an armature having a traditional coil winding pattern employed, and illustrating how the commutation zone of the second coil of a two-coil-per-slot winding arrangement causes the commutation zone of the second coil to lag behind the commutation zone of the first coil, thus leading to brush arcing.
Figure 3:
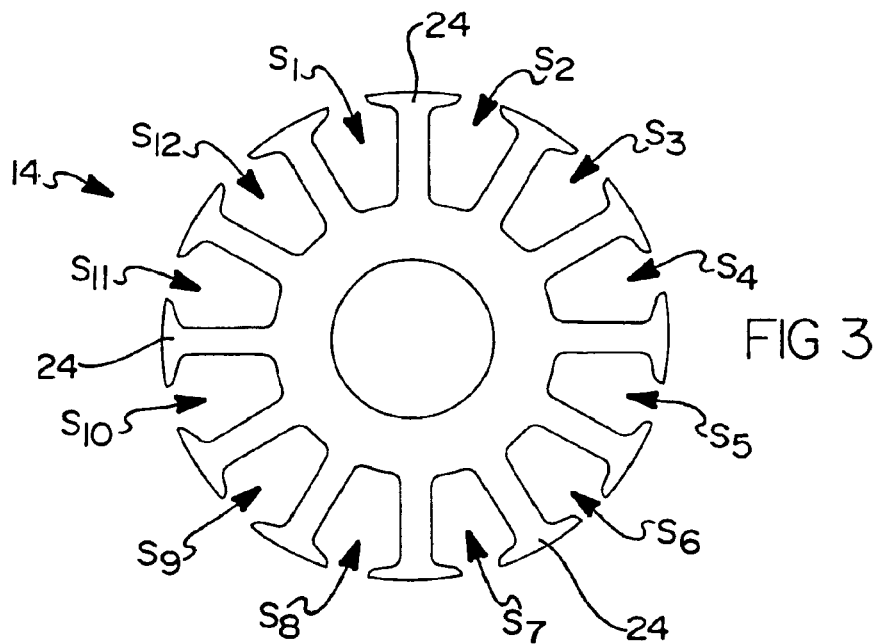
FIG. 3 is a simplified cross sectional end view of the armature of FIG. 2 illustrating a lamination stack for an armature having a plurality of twelve slots around which the coils of the armature are to be wound.

Referring to FIG. 3, the lamination stack 14 is illustrated without any coils wound thereon. The lamination stack 14 includes a plurality of radially projecting lamination posts or "teeth" 24. Twelve slots $S_1$–$S_{12}$ are formed between the posts 24. It will be appreciated immediately, however, that while twelve such slots are illustrated, that a greater or lesser plurality could be employed. The overall number of slots depends on the number of commutator segments and will always be one-half the number of commutator segments used.

Figure 4:
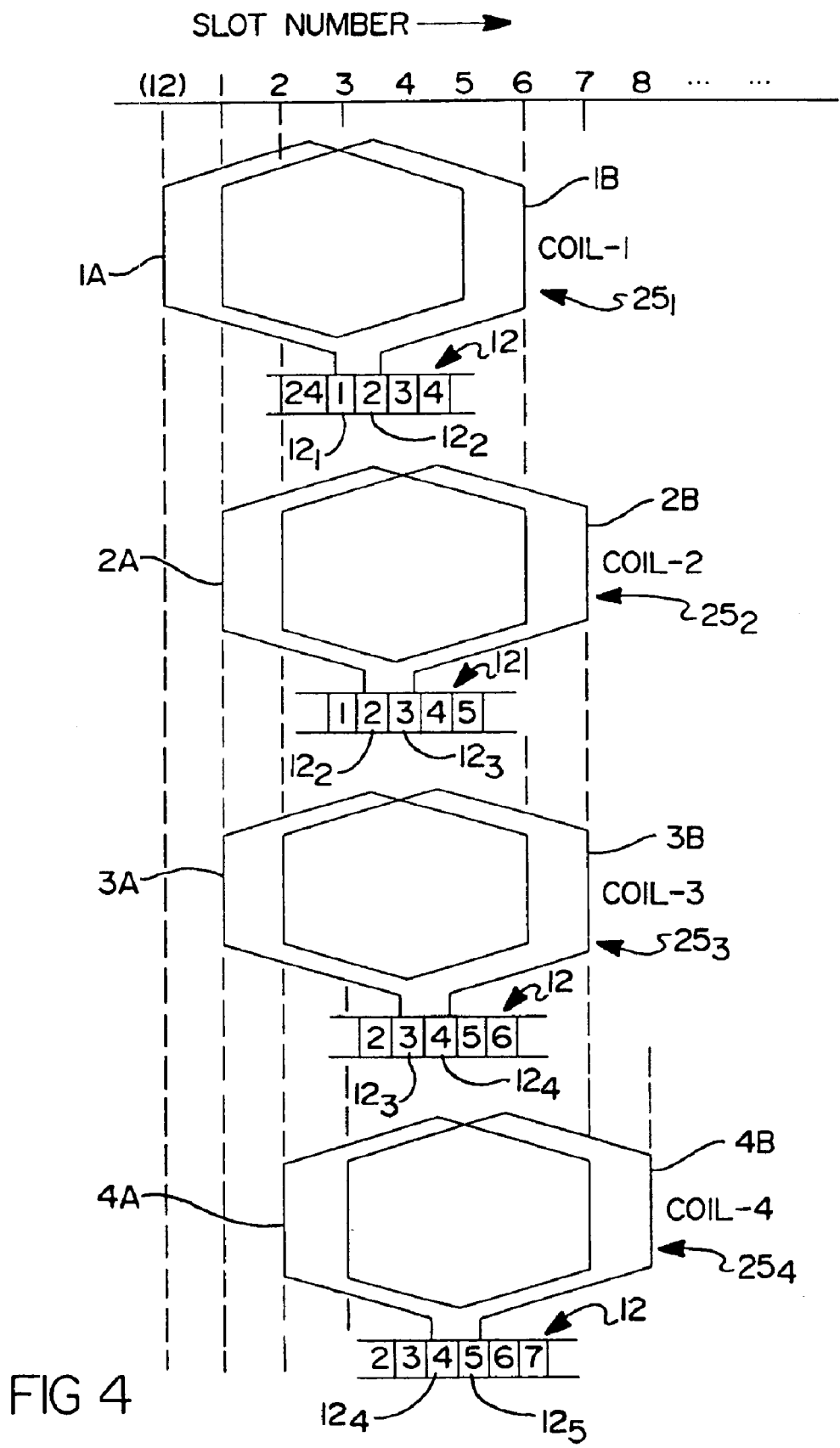
FIG. 4 illustrates in simplified fashion a coil winding pattern in accordance with the present invention.

Referring now to FIG. 4, the winding pattern of the present invention will be described. Coil number 1 ($25_1$) has a first subcoil portion 1A and a second subcoil portion 1B formed in series with subcoil portion 1A. Subcoil portion 1A has one end thereof coupled to commutator segment number $12_1$ and the end of second subcoil portion 1B is coupled to commutator segment number $12_2$. Subcoil portion 1A of coil $25_1$ includes a first plurality of turns, for example seven turns, which are wound around slots $S_{12}$ and $S_5$ of the lamination stack 14. Subcoil portion 1B of coil $25_1$ is then wound for a larger plurality of turns, in this example 17 turns, in slots $S_1$ and $S_6$ of the lamination stack 14. It will be appreciated that the precise number of windings of each subcoil portion can vary considerably, but in the preferred embodiment the number of turns between the subcoil portion 1B and portion 1A of coil $25_1$ is such that one has preferably about three times as many winding turns as the other. The number of turns also alternates between the subcoils, as will be described further, such that adjacent coils will always have the two first subcoil portions with differing numbers of winding turns, and the two second subcoil portions with differing numbers of winding turns.

Coil number 2 ($25_2$) also has a first subcoil portion 2A and a second subcoil 2B in series with one another. Subcoil portion 2A is wound in slots $S_1$ and $S_6$ with seventeen turns. Subcoil portion 2B is wound in series with portion 2A but around slots $S_2$ and $S_7$ of the lamination stack 14, and with seven winding turns. The end of subcoil portion 2A is coupled to commutator segment $12_2$ while the end of subcoil portion 2B is coupled to commutator segment $12_3$. The first subcoil portion 2A of coil $25_2$ overlaps the second subcoil portion 1B of coil $25_1$.

Coil number 3 ($25_3$) includes a first subcoil portion 3A and a second subcoil portion in series with one another 3B. Subcoil portion 3A is attached to commutator segment number $12_3$ and includes seven winding turns wound around slots $S_1$ and $S_6$. Subcoil portion 3B is formed in series with subcoil portion 3A and includes seventeen turns wound in slots $S_2$ and $S_7$, with the end thereof being coupled to commutator segment 124.

Coil 4 ($25_4$) also includes a first subcoil portion 4A and a second subcoil portion 4B in series with subcoil portion 4A. Subcoil portion 4A has its end coupled to commutator segment $12_4$ and includes seventeen turns wound around slots $S_2$ and $S_7$. Subcoil portion 4B includes seven turns wound around slots $S_3$ and $S_8$, with the end thereof being coupled to commutator segment $12_5$. It will be noted that coil $25_4$ partially overlaps coil $25_3$. In effect, one of the subcoil portions of each adjacent pair of coils 25 overlap with each other.

The above-described pattern for coils $25_1$–$25_4$ is repeated until all of the coils (in this example 12 coils) are wound onto the lamination stack 14. Each of the ends of the coils $25_1$–$25_{12}$ are further secured to immediately adjacent pairs of commutator segments $12_1$–$12_{24}$. For example, coil $25_5$ has its ends secured to commutator segments $12_5$ and $12_6$, coil $25_6$ to segments $12_6$ and $12_7$, and so forth. Using the winding pattern shown in FIG. 4 and described above, the slots that each subcoil of every coil 25 is wound in are shown in FIG. 6. The total number of winding turns in each slot, as well as the subcoils located in each slot 1–12, can be summarized from the information shown in FIG. 6, which summary is presented in FIG. 7.

Figure 5:
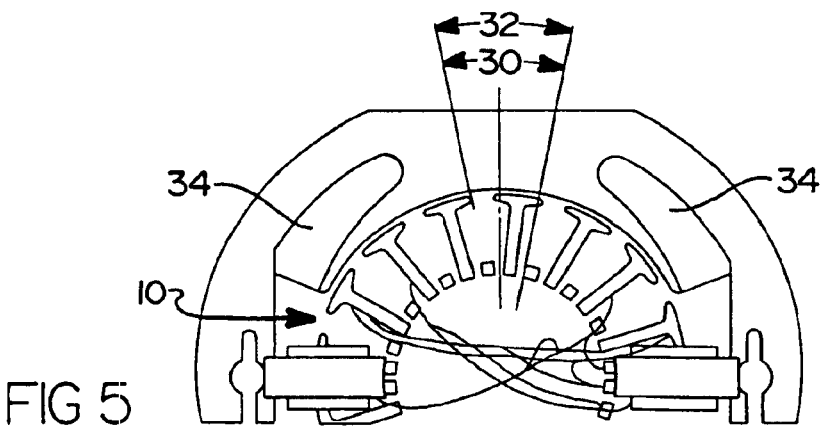
FIG. 5 is a simplified end view of the armature illustrating how the winding pattern produces commutation zones for the first and second coil with subcoil portions which are radially aligned with one another to improve commutation efficiency and reduce brush arcing.

The above-described winding pattern significantly improves the commutation performance of all of the second coil portions of the coils 25. Splitting each coil 25 into first and second subcoil portions allows each first subcoil portion to shift its magnetic axis away (i.e., laterally), from the position it would have otherwise had in a traditional two-coil-per-slot approach. This is illustrated in FIG. 5. All of the first subcoil portions shift their magnetic axes forward to produce a first coil commutation zone, as indicated by line 30, and all of the second subcoil portions shift their magnetic axes backward to produce a second coil commutation zone, as indicated by line 32, in reference to the armature's 10 rotational direction. Both of these commutation zones are now in a magnetic neutral zone between field coils 34. With a turns ratio between the two subcoils of about 3:1, this winding pattern smoothes out the magnetic "unevenness" between adjacent coils, which is a drawback with traditional two-coil-per-slot winding patterns. This, in connection with the shifting of the resultant magnetic axes of each coil, serves to significantly improve the commutation efficiency of the motor and to reduce the overall brush arcing.

The winding pattern employed on the armature 10 of the present invention also serves to significantly reduce the cost of constructing the armature by eliminating components that would otherwise be needed to sufficiently attenuate the EMI that results from traditional two-coil-per-slot winding patterns. Typically, inductive components are required to form a choke circuit associated with each armature brush. These additional components increase the overall cost of manufacturing a motor, as well as increase the complexity of the task of replacing the brushes during repair procedures.

The apparatus and method of the present invention thus allows an armature to be formed which significantly reduces brush arcing, and therefore the EMI that is present with traditional two-coil-per-slot armature constructions for all brush commutated electric motors. The apparatus and method of the present invention further does not increase the complexity of the manufacturing process or require additional component parts that would otherwise increase the overall cost of construction of an armature.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for manufacturing an armature of an electric motor to reduce brush arching, the method comprising:

forming an armature having a plurality of circumferentially arranged slots for winding thereon a plurality of coils;

segmenting a first coil into first and second subcoil portions in series with one another;

winding said first subcoil portion of said first coil around a first pair of spaced apart ones of said slots with a first plurality of winding turns;

winding said second subcoil portion of said first coil around a second pair of spaced apart slots, which are circumferentially shifted from said first pair of slots, with a second plurality of winding turns;

segmenting a second coil into first and second subcoil portions in series with one another;

winding said first subcoil portion of said second coil around said second pair of spaced apart ones of said slots a number of turns in accordance with a third plurality of winding turns;

winding said second subcoil portion of said second coil around a third pair of spaced apart slots shifted circumferentially from said second pair of spaced apart ones of said slots, with a fourth plurality of winding turns;

segmenting a third coil into first and second subcoil portions in series with one another; and winding said first subcoil portion of said third coil in the same slots of said lamination stack as said first subcoil portion of said second coil, and winding said second subcoil portion of said third coil in the same slots as said second subcoil of said second coil.

2. The method of claim 1, further comprising:

segmenting a fourth coil into first and second subcoil portions; and winding said first subcoil portion in a pair of slots that is circumferentially offset by one said slot from said first subcoil portion of said third coil.

3. The method of claim 2, further comprising:

forming said first and second subcoil portions of said fourth coil with different numbers of winding turns.

4. A method for manufacturing an electric motor, comprising:

forming a gear reduction assembly;

coupling an armature having an output shaft to said gear reduction assembly;

forming said armature with a plurality of circumferentially arranged slots for winding thereon a plurality of coils;

segmenting a first coil into first and second subcoil portions in series with one another;

winding said first subcoil portion of said first coil around a first pair of spaced apart ones of said slots with a first plurality of winding turns;

winding said second subcoil portion of said first coil around a second pair of spaced apart slots, which are circumferentially shifted from said first pair of slots, with a second plurality of winding turns;

segmenting a second coil into first and second subcoil portions in series with one another;

winding said first subcoil portion of said second coil around said second pair of spaced apart ones of said slots a number of turns in accordance, with a third plurality of winding turns;

winding said second subcoil portion of said second coil around a third pair of spaced apart slots shifted circumferentially from said second pair of spaced apart ones of said slots, with a fourth plurality of winding turns;

segmenting a third coil into first and second subcoil portions in series with one another; and winding said first subcoil portion of said third coil in the same slots of said lamination stack as said first subcoil portion of said second coil, and winding said second subcoil portion of said third coil in the same slots as said second subcoil of said second coil.

5. The method of claim 4, further comprising:

segmenting a fourth coil into first and second subcoil portions; and winding said first subcoil portion in a pair of slots that is circumferentially offset by one said slot from said first subcoil portion of said third coil.

6. The method of claim 5, further comprising the step of winding said second subcoil portion of said fourth coil in a pair of slots that is circumferentially offset by one said slot from said first subcoil portion of said fourth coil.

7. A method of forming an electric motor, comprising:

forming an armature with a plurality of circumferentially arranged slots;

segmenting a first coil into first and second subcoil portions in series with one another;

winding said first subcoil portion of said first coil around a first pair of spaced apart ones of said slots with a first plurality of winding turns;

winding said second subcoil portion of said first coil around a second pair of spaced apart slots, which are circumferentially shifted from said first pair of slots, with a second plurality of winding turns;

segmenting a second coil into first and second subcoil portions in series with one another;

winding said first subcoil portion of said second coil around said second pair of spaced apart ones of said slots a number of turns in accordance with a third plurality of winding turns;

winding said second subcoil portion of said second coil around a third pair of spaced apart slots shifted circumferentially from said second pair of spaced apart ones of said slots, with a fourth plurality of winding turns;

segmenting a third coil into first and second subcoil portions in series with one another; and winding said first and second subcoil portions of said third coil in the same slots as first and second subcoil portions of said second coil.

8. The method of claim 7, further comprising winding a fourth coil in a pair of slots of said armature that are shifted circumferentially by one slot position from said third coil.

9. The method of claim 7, further comprising:

forming a fourth coil into first and second subcoil portions;

winding said first subcoil portion of said fourth coil in the same said slots on said armature as said second subcoil portion of said third coil; and winding said second subcoil portion of said fourth coil in slots that are shifted circumferentially by one slot position from said second subcoil portion of said third coil.

10. A method for winding an armature of an electric motor, wherein the armature has a lamination stack forming a plurality of circumferentially arranged slots for winding thereon a plurality of coils, said method comprising:

a) segmenting a first coil into first and second subcoil portions in series with one another;

b) winding said first subcoil portion of said first coil around a first pair of spaced apart ones of said slots with a first plurality of winding turns;

c) winding said second subcoil portion of said first coil around a second pair of spaced apart slots, which are circumferentially shifted from said first pair of slots, with a second plurality of winding turns;

d) segmenting a second coil into first and second subcoil portions in series with one another;

e) winding said first subcoil portion of said second coil around said second pair of spaced apart ones of said slots a number of turns in accordance with a third plurality of winding turns;

f) winding said second subcoil portion of said second coil around a third pair of spaced apart slots shifted circumferentially from said second pair of spaced apart ones of said slots, with a fourth plurality of winding turns;

g) segmenting a third coil into first and second subcoil portions in series with one another; and h) winding said first subcoil portion of said third coil in the same slots of said lamination stack as said first subcoil portion of said second coil, and winding said second subcoil portion of said third coil in the same slots as said second subcoil portion of said second coil.

11. The method of claim 10, further comprising winding said first subcoil portion of said third coil and said first subcoil portion of said second coil such that one has approximately three times the number of winding turns as the other.

12. The method of claim 10, wherein winding said first and second subcoil portions of said first coil comprises winding one with a greater number of winding turns than the other.

13. The method of claim 12, wherein winding said first and second subcoil portions of said first coil comprises winding one with approximately three times the number of winding turns as the other.

14. A method of forming an electric motor comprising:

forming an armature having a plurality of spaced apart winding slots;

a) segmenting a first coil into first and second series coupled subcoil portions;

b) winding said first subcoil portion onto a first pair of spaced apart ones of said slots;

c) winding said second subcoil portion onto a second pair of spaced apart ones of said slots that are offset from said first pair of slots by at least one slot position;

d) segmenting a second coil into first and second series coupled subcoil portions;

e) winding said first subcoil portion of said second coil in said second pair of slots;

f) winding said second subcoil portion of said second coil in a third pair of spaced apart ones of said slots that are offset by at least one slot position from said second pair of slots;

g) segmenting a third coil into first and second series coupled subcoil portions;

h) winding said subcoil portions of said third coil in said second and third pairs of slots so that no offsetting of said third coil occurs, relative to said second coil; and i) repeating a winding pattern defined by steps a)–h) for said first, second and third coils for an additional plurality of coils.

15. The method of claim 14, wherein step c) involves winding said second subcoil portion of said first coil such that it is offset by only 1 slot position from said first subcoil portion of said first coil.

16. The method of claim 14, wherein step f) involves offsetting said third and fourth pairs of said slots by only 1 slot position.

* * * * *